April 27, 1954  M. W. LINDQUIST ET AL  2,676,380
SNAP HOOK CONNECTING LINK
Filed July 16, 1952
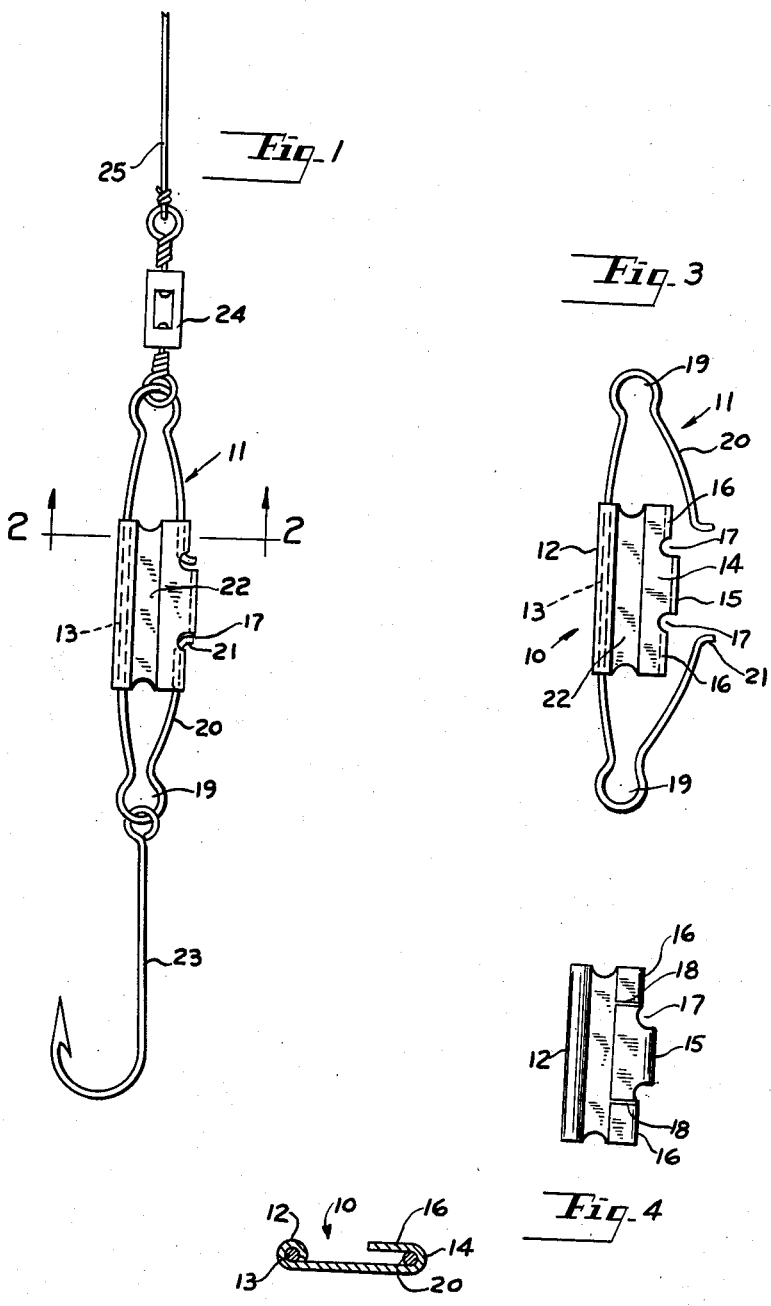
INVENTORS
Morris W. Lindquist and
BY Willard Masys
Louis Chayka
ATTORNEY.

Patented Apr. 27, 1954

2,676,380

UNITED STATES PATENT OFFICE 2,676,380

SNAP HOOK CONNECTING LINK

Morris W. Lindquist and Willard Masys,
Detroit, Mich.

Application July 16, 1952, Serial No. 299,066

1 Claim. (Cl. 24—236)

Our connecting link is adapted to be used as a slip-proof means of attachment for fish hooks at the end of a fish line, the object of our improvement being to provide a link which includes interlocking elements of a type preventing unlocking thereof by a mere pull upon the fish hook which is suspended from the link. This is one of the flaws of the present links which on a sudden pull will fly open.

A more specific object of our improvement is to provide a link which will not depart too radically from links already in use but which will retain a fish hook securely against displacement.

A further object of our improvement is to provide a snap hook connecting link which will be simple in its structural design but will be fully practical and easy to manufacture.

We shall now describe our improvement with reference to the accompanying drawing in which:

Fig. 1 is a side elevational view of our snap hook connecting link as suspended from a fish line, the view disclosing a fish hook suspended from the link;

Fig. 2 is a transverse sectional view on line 2—2 of Fig. 1;

Fig. 3 is a side view of the link alone, the view disclosing parts thereof in a disengaged position when the link is open;

Fig. 4 is a side elevational view of a modified part of our connecting link.

Similar numerals refer to similar parts throughout the several views.

The body of the link comprises a sheet metal guard, generally identified by numeral 10, and a wire member, generally identified by numeral 11, serving as a means upon which the guard is mounted. The guard is made of an oblong, substantially rectangular blank, one side of the blank being curled to form a cylindrical bead 12 frictionally gripping the mid-portion 13 of said wire member 11. The opposite side of the blank is bent upon itself in a hairpin turn to form a sheath or a keeper 14.

However, it will be noted that the mid-portion 15 of the keeper projects beyond the line of turn of the adjoining end-portion 16, as best shown in Fig. 3. Furthermore, the folded-over portion of the keeper is provided with a pair of apertures 17 to separate said mid-portion 15 from said end-portion 16.

To facilitate the manufacture of the keeper 14, the folded-over portion may be split crosswise, as indicated by numerals 18 in Fig. 4. As a result of the above-named formation of said keeper its mid-portion 15 forms a shoulder projecting laterally outwardly from the lines of turn of portion 16 and serves a purpose to which we shall presently allude.

The complementary element of our snap hook connecting link consists of a single piece of resilient wire 11, preferably made of steel or bronze, said piece including a length marked 13 above referred to. The last-named length is bent upon itself at each end to form a circular loop 19. From the loop the wire runs reversely along said portion 13, constituting a leg 20 normally diverging from said portion 13 and terminating with an outwardly-turned pin or lug 21.

When the link is in what may be called its closed position, as shown in Fig. 1, the legs fit into the keeper and the lugs 21 enter apertures 17 from the direction of mid-portion 13 of the wire member. This may be done as one side of the keeper is open, as shown at 22.

It will be noted that the ends of said lugs 21 project beyond the line of turn of end sections 16 but do not reach the line of turn of mid-portion 15 of said keeper. Thus, the mid-portion serves as a protecting shoulder over said ends of lugs 21 and aids in preventing snagging on weeds when the fish-line is in water.

In Fig. 3 we are showing our device in its open position when the lugs 20 are disengaged from the keeper and spread apart from said mid-portion 13 of the wire member, making it possible to secure upon the loops a fish-hook 23 and a swivel joint 24, respectively. The latter serves as a means of attachment to a fish-line 25. Thereupon, the legs may be returned manually to their original position, as shown in Fig. 1, and once the lugs 21 have entered apertures 17 a pull downwardly upon the lower loop 19 or a pull upwardly upon the upper loop will not be sufficient to free the lugs from said apertures 17.

It will be understood that some minor changes may be made in the structure of our connecting link, but having in mind its principal features we wish to present the following claim:

A snap hook connecting link for fishlures, the link comprising a length of stiff, resilient wire bent upon itself at each end in a hairpin turn to form a loop and a reversely-extending leg normally diverging from said straight portion but being adapted to be compressed in the direction thereof, each leg terminating with a substantially perpendicular outwardly-disposed lug, and an oblong sheet metal member affixed at one side to the straight portion of the wire midway the loops and having at the opposite side a portion folded over upon itself in a hairpin turn to form a keeper U-shaped in section for the legs, the keeper including a mid-portion and two end portions, the line of turn of said mid-portion being offset outwardly with relation to the line of turn of said end portions to thus form a shoulder beyond the line of turn of said end portions, said keeper being provided with an aperture at the junction of each end portion with said shoulder, the lugs of the legs in closed position projecting through said apertures and beyond the line of turn of said end portions but short of the line of turn of said mid-portion to thus create firm locking engagement with said end portions and also to permit said mid-portion serving as a protecting shoulder for preventing snagging of said lugs when the fishlure is in use.

References Cited in the file of this patent

UNITED STATES PATENTS

| Number | Name | Date |
| --- | --- | --- |
| 1,094,568 | Hornich, Jr. | Apr. 28, 1914 |
| 1,235,854 | Stapf | Aug. 7, 1917 |